(12) United States Patent
Gerez et al.

(10) Patent No.: US 7,524,112 B2
(45) Date of Patent: Apr. 28, 2009

(54) BEARING SUPPORT WITH DOUBLE STIFFENER

(75) Inventors: Valerio Gerez, Yerres (FR); Edouard Jadczak, Le Mee sur Seine (FR)

(73) Assignee: SNECMA, Paris (FR)

( * ) Notice: Subject to any disclaimer, the term of this patent is extended or adjusted under 35 U.S.C. 154(b) by 711 days.

(21) Appl. No.: 11/023,501

(22) Filed: Dec. 29, 2004

(65) Prior Publication Data

US 2005/0152626 A1    Jul. 14, 2005

(30) Foreign Application Priority Data

Jan. 12, 2004    (FR)    ................... 04 00220

(51) Int. Cl.
*F16C 27/00* (2006.01)
(52) U.S. Cl. .................... 384/99; 384/101; 384/535
(58) Field of Classification Search .................. 384/99, 384/535, 581, 450, 556, 101, 102; 417/406
See application file for complete search history.

(56) References Cited

U.S. PATENT DOCUMENTS

| 4,084,861 | A | * | 4/1978 | Greenberg et al. ............ 384/99 |
| 4,214,796 | A | | 7/1980 | Monzel et al. |
| 4,872,767 | A | * | 10/1989 | Knapp .......................... 384/99 |
| 5,088,840 | A | * | 2/1992 | Radtke ....................... 384/535 |
| 5,102,236 | A | * | 4/1992 | Ide ............................. 384/103 |
| 5,110,257 | A | | 5/1992 | Hibner et al. |
| 5,433,584 | A | | 7/1995 | Amin et al. |
| 5,531,522 | A | * | 7/1996 | Ide et al. ...................... 384/99 |
| 5,603,574 | A | | 2/1997 | Ide et al. |
| 6,325,546 | B1 | | 12/2001 | Storace |

FOREIGN PATENT DOCUMENTS

| DE | 1 575 635 | 2/1970 |
| DE | 102 58 528 A1 | 7/2004 |
| EP | 0 469 747 A1 | 2/1992 |
| EP | 0 814 236 A1 | 12/1997 |
| FR | 2439331 | 10/1979 |
| GB | 2033024 | 5/1980 |
| WO | WO 98/54443 | 12/1998 |

* cited by examiner

*Primary Examiner*—Richard W L Ridley
*Assistant Examiner*—Justin Krause
(74) *Attorney, Agent, or Firm*—Oblon, Spivak, McClelland, Maier & Neustadt, P.C.

(57) ABSTRACT

The present invention relates to a bearing support for a rotating engine such as a gas turbine engine, with a rotating shaft supported by at least one bearing and a frame, capable of running at least two different running speeds, characterised in that it comprises at least two mechanical supporting structures with different stiffnesses combined so as to support the bearing at one of these stiffnesses.

The invention has the advantage that the use of mechanical structures avoids the presence of any hydraulic equipment, since the stiffness forces thus introduced can directly oppose excitation forces generated by the unbalanced mass of the engine shaft.

6 Claims, 2 Drawing Sheets

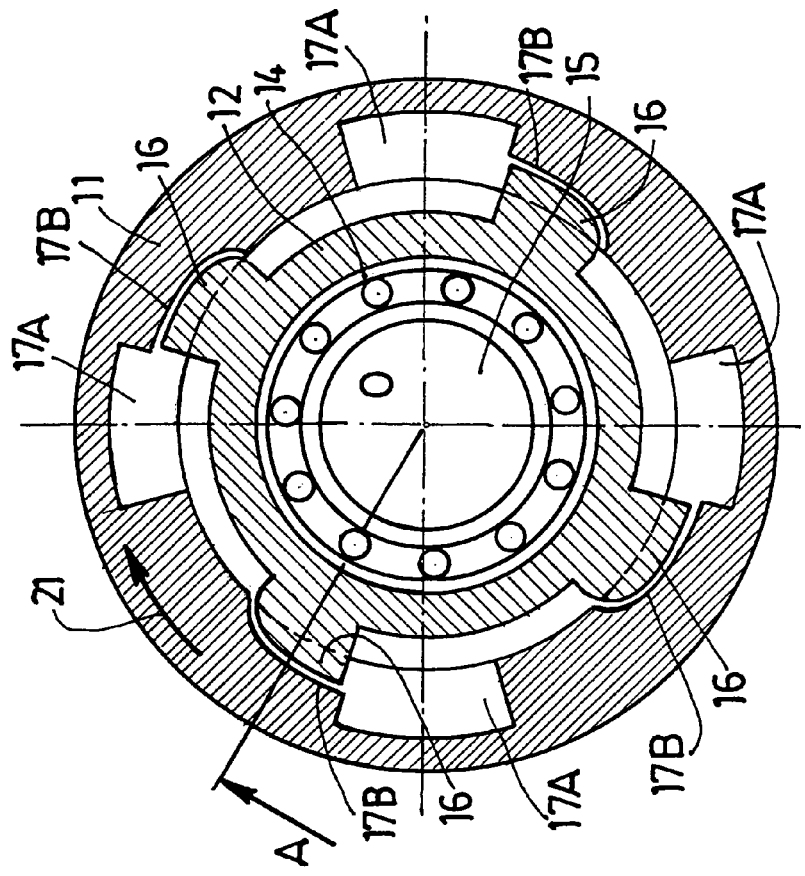
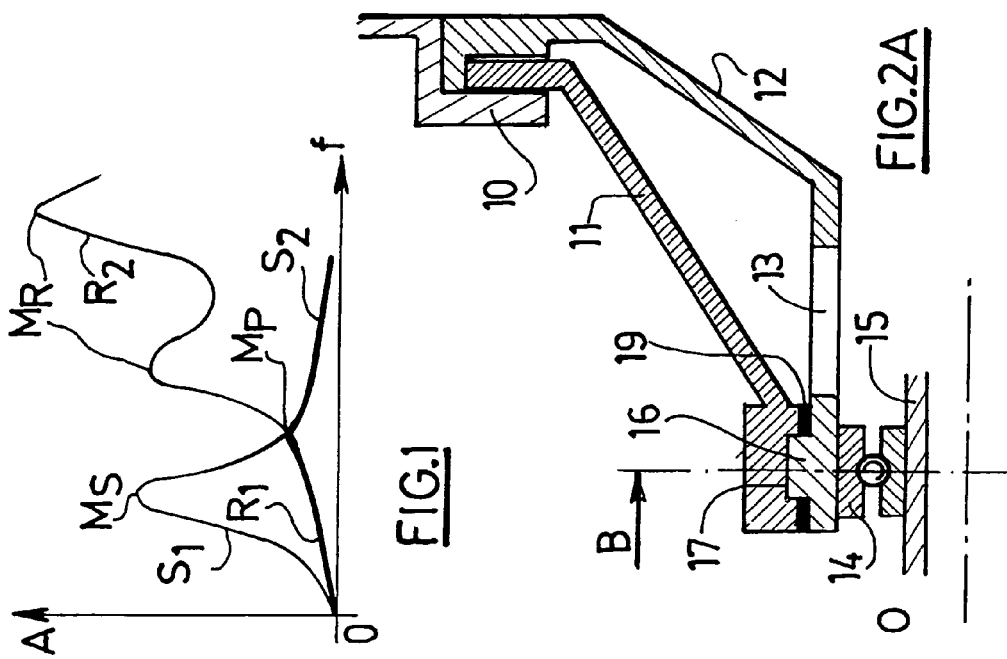
FIG.1
FIG.2A
FIG.2B

BEARING SUPPORT WITH DOUBLE STIFFENER

This invention relates to bearing supports for rotating engine shafts. It relates particularly to gas turbine engines.

At the present time, the life of roller, oil and gas bearings for engine shafts, and structures are very strongly dependent on vibrational characteristics of the engine assembly including its frame, transmission shaft, bearings and supports.

The main sources of vibrational excitation depend on the mechanical unbalanced mass of the engine shaft, which is always present due to manufacturing imperfections. Subsequently, the main vibration frequencies affecting the engine assembly are close to the engine rotation frequency.

As the vibrational response of each part of this assembly mentioned above increases, the bearings and elements of the structure are increasingly stressed, more affected by fatigue, with the result that their life is shortened.

These vibrations also induce very severe noise nuisance.

One means of reducing the amplitude of these vibrations consists of providing bearing supports arranged to adapt the resonant frequency with respect to the rotation frequency. For example, bearing supports are designed such that their main resonant frequency is very different from the rotation frequency corresponding to the engine running speed.

But in some cases an engine can be used at different speeds, for example at two speeds, namely low speed and high speed.

Different solutions have been proposed to overcome this problem.

For example, U.S. Pat. No. 5,433,584 discloses a support for two bearings supporting a shaft at both ends, the support being arranged to have a different stiffness on each of the two bearings, the combination of the two stiffnesses providing a means of limiting vibrations at normal running speed through one of its bearings and resisting an abnormal unbalanced mass or other similar abnormal event of the same type on the other bearing.

This solution is not satisfactory, since one of the two bearings is still affected by an abnormal vibration level as a result of the problem mentioned above.

Documents U.S. Pat. No. 5,110,257 and FR2439331 propose a solution using a viscous damping, the fluid being controlled as a function of the engine speed, to modify damping of the support during operation of the engine, and therefore to adapt the vibrational response of the assembly during the current type of operation, avoiding the disadvantage mentioned above.

This solution is complex since it requires the use of a fluid for which the presence has to be managed by special hydraulic equipment, and it is also limited to viscous damping.

With this invention, the inventors propose a bearing support for a rotating engine such as a gas turbine engine, with a rotating shaft supported by at least one bearing and a frame, capable of running at not less than two different running speeds and comprising at least one mechanical supporting structure with low stiffness and a supporting structure with high stiffness combined so as to support the bearing at one of these stiffnesses, characterised by the fact that the supporting structure with low stiffness is solidarised to the supporting structure with high stiffness when the engine is running at a speed less than a determined rotation frequency and is desolidarised from the supporting structure with high stiffness when the engine is running at a speed higher than the rotation frequency.

The use of mechanical structures avoids the presence of any hydraulic equipment, since the stiffness forces thus introduced can directly oppose excitation forces generated by the unbalanced mass of the engine shaft.

The supporting structure with low stiffness supports the bearing and the supporting structure with high stiffness supports the supporting structure with low stiffness when the engine is running at one of the two speeds, for example at low engine rotation speeds, to oppose the shaft unbalanced mass.

The bearing support is arranged to separate the supporting structure with high stiffness from the supporting structure with low stiffness when the engine is running at either of the two speeds, for example high engine rotation speeds, the structure with low stiffness filtering the vibration excitation generated by the shaft unbalanced mass.

Advantageously, the supporting structure with low stiffness is in the form of a squirrel cage to make it more flexible.

According to another characteristic, the support for an engine running at not less than three different running speeds comprises at least three supporting mechanical structures with different stiffnesses combined to support the bearing at one of these stiffnesses.

The invention also relates to the servocontrol system for controlling means of actuating one structure rather than another, with the said means being controlled as a function of the shaft speed or vibrational amplitude through control computers on the engine and/or the aircraft on which the engine is installed.

The invention will be better understood after reading the following description of the bearing support according to a preferred embodiment of the invention and the appended figures, wherein:

FIG. 1 shows a frequency diagram of responses of the supporting structure under vibrational excitation of the engine rotor;

FIGS. 2A and 2B show longitudinal and cross-sectional views of the bearing and its support according to the invention, the supporting structures being solidarised.

Figure 3A:
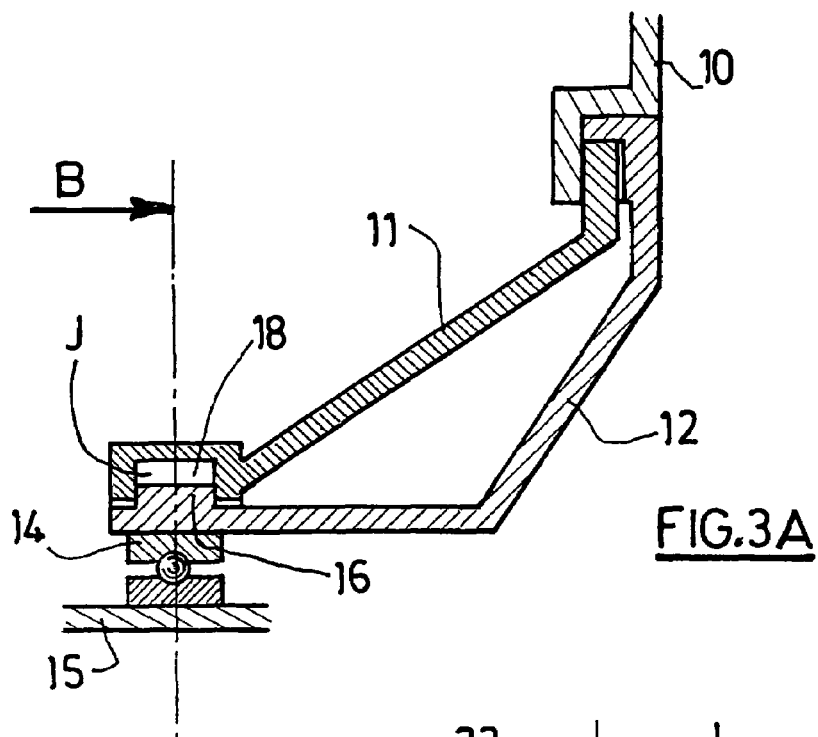
FIGS. 3A and 3B show longitudinal and cross-sectional views of the bearing and its support according to the invention, the supporting structures being desolidarised.

With reference to FIGS. 2A and 2B, in which FIG. 2A is a section along direction A shown in FIG. 2B, and FIG. 2B is a section along direction B shown in FIG. 2A, the rotating engine comprises a frame 10 and a shaft 15 rotating about the O axis of the engine when it is running.

The shaft is held in place by a bearing 14, in this case a ball bearing, and a bearing support 14 composed of two coaxial supporting structures, one outer structure 11 surrounding the other inner structure 12. They are both approximately conical in shape towards frame 10. The inner structure 12 of the support is cylindrical close to the bearing 14, such that the two structures combine both at the frame 10 and at the bearing 14 as described below.

The inner supporting structure 12 is solidarised to the frame 10 and the bearing 14. It is solidarised, with low stiffness or it is flexible.

It may be designed with a so-called squirrel cage form 13, to make it more flexible.

The outer supporting structure 11 is significantly stiffer than the inner structure, and may possibly be ribbed on its inner surface. The ribs are not shown.

The vibrational characteristics of these supporting structures are shown diagrammatically on the diagram of their frequency response spectra given in FIG. 1. They depend on their corresponding stiffnesses and their use in the device described herein will be described below.

This final structure 11, at its end close to the frame 10, is installed free to slide in rotation on the frame and on the flexible supporting structure 12. It can rotate about the O axis, in the two rotation directions, under the action of manual or electrical mechanical control, by appropriate conventional means, not shown and known to those skilled in the art, for example a lever, an electric motor or hydraulic or pneumatic jacks.

At its end close to the bearing 14, the supporting structure 11 can rotate around the solidarised supporting structure 12 along an arc limited by radial teeth 16, in this case there are four teeth fixed to this final structure 12. The teeth 16 cooperate with four housings 17 formed on the inner face of a flange of the structure 11 perpendicular to the axis of rotation. The housings have two parts 17A, 17B for which the bottoms are at different distances from the axis.

Figure 3B:
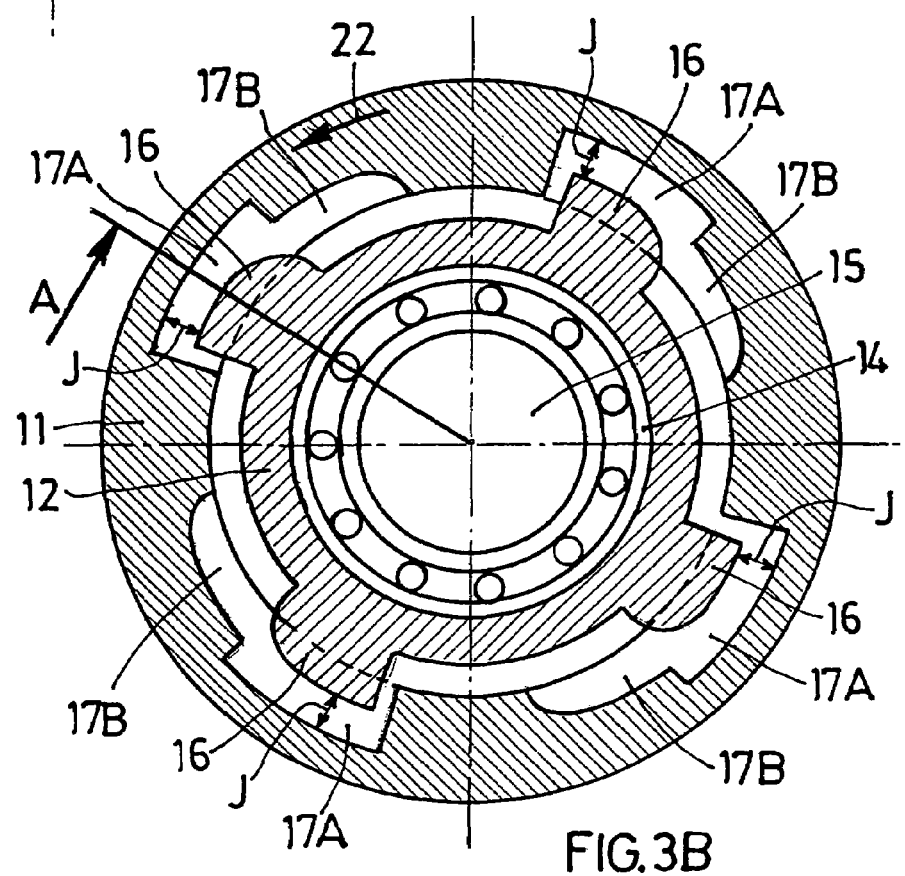

In the position illustrated in FIGS. 3A and 3B, the teeth 16 are arranged in the parts 17A with a radial clearance J between their vertex and the bottom of the housings. This clearance is greater than the unbalanced mass effects of the rotating shaft.

The parts 17B of the housings have a smaller diameter. The teeth 16 may all be inserted in housings simultaneously with no radial clearance, exactly matching the shapes.

When the teeth 16 are arranged in the parts 17B, as shown in FIGS. 2A and 2B, the supporting structures 11 and 12 are solidarised close to the bearing. On the other hand, these structures are desolidarised at this location in FIGS. 3A and 3B.

With reference to the diagram in FIG. 1, due to their different stiffnesses the structures 11 and 12 have vibrational characteristics such that their response to vibrational excitation generated by rotation of the shaft at frequency f can be represented by curves S1, S2 for the flexible structure and R1, R2 for the stiff structure.

Resonances MS and MR illustrated by these two curves are clearly separated and the two curves intersect at a point Mp corresponding to a rotation frequency fp characterised by low vibrational response amplitude for the two structures simultaneously. At frequencies lower than frequency fp, the stiff structure 11 does not have a significant response R1. At higher frequencies, the flexible structure filters excitations of the shaft 15 and there is no important response S2, although conversely responses S1 and R2 are high.

When the outer supporting structure 11 is mechanically controlled in rotation to rotate in a first direction 22 in FIG. 3B using the above control, it moves into the high stiffness position shown in FIGS. 2A and 2B. Thus, the supporting structure 12 with low stiffness supports the bearing 14 and the supporting structure 11 with high stiffness supports the supporting structure with low stiffness.

In this position, the supporting structures 11 and 12 are completely solidarised, and the stiffness characteristics of the bearing support assembly are determined by the characteristics of the stiffer structure, which is the outer supporting structure 11, giving a frequency response R1. This position is controlled when the engine runs at low speed so that the bearing support opposes frequency excitations generated by the unbalanced mass of the rotating shaft.

When the outer supporting structure 11 is mechanically controlled in rotation to turn in a second direction 21 in FIG. 2B, using the above control, it moves into the low stiffness position shown in FIGS. 3A and 3B.

In this position, the supporting structures 11 and 12 are desolidarised at the bearing, and the stiffness characteristics of the bearing support assembly are determined by the characteristics of the more flexible structure, which is the inner supporting structure 12, giving a frequency response R2. This position is controlled when the engine runs at high speed so that the bearing support filters vibration excitation generated by the unbalanced mass of the rotating shaft.

Thus, to optimise adaptation of global vibrational characteristics of the bearing support, the outer structure 11 is mechanically controlled in rotation in the second direction 21 when the engine speed is below the rotation frequency fp, and in the first direction 22 when it is above this rotation frequency.

The global frequency response of the engine assembly is represented by the frequency curve composed of two curve branches R1 and S2, for which the common maximum is presented by the intersection point Mp of curves representative of frequency responses of the two structures 11 and 12 making up the engine bearing support, this maximum being much less than the maxima Ms and MR of the two curves representative of the frequency responses of these two structures.

The invention claimed is:

1. A bearing support for a rotating engine with a rotating shaft that rotates about a shaft axis, said rotating shaft being supported by at least one bearing and a frame, said rotating engine being capable of running at least two different running speeds, said bearing support comprising:
    a first mechanical supporting structure with a first stiffness, wherein said first mechanical supporting structure supports said bearing; and
    a second mechanical supporting structure with a second stiffness,
    wherein said first and second mechanical supporting structures rotate with respect to each other about said shaft axis such that, in a first rotational position, the first mechanical supporting structure is mechanically coupled to the second mechanical supporting structure such that said second mechanical supporting structure supports said first mechanical supporting structure and, in a second rotational position, said first mechanical supporting structure is mechanically decoupled from the second mechanical supporting structure such that said second mechanical supporting structure does not support said first mechanical supporting structure,
    wherein the first mechanical supporting structure comprises radial teeth and the second mechanical supporting structure comprises housings cooperating with the radial teeth, and
    wherein the housings comprise parts cooperating with the radial teeth with a radial clearance to mechanically decouple the first and second mechanical supporting structures from each other, said clearance being greater than an unbalanced mass effects of the rotating shaft.

2. A bearing support according to claim 1, wherein the housings comprise parts cooperating with the readial teeth so as to mechanically couple the first and second mechanical supporting structures to each other.

3. A bearing support according to claim 1, wherein the first mechanical supporting structure is in the form of a squirrel cage.

4. A bearing support according to claim 1, for an engine running at least three different running speeds, comprising at least three mechanical supporting structures with different stiffness combined to support the bearing at one of these stiffness.

5. A bearing support according to claim 1, wherein the first stiffness is lower than said second stiffness.

6. A bearing support according to claim 5, wherein said second mechanical supporting structure is slidable in rotation on said frame and on said first mechanical supporting sturcture.

* * * * *

UNITED STATES PATENT AND TRADEMARK OFFICE
CERTIFICATE OF CORRECTION

PATENT NO. : 7,524,112 B2 Page 1 of 1
APPLICATION NO. : 11/023501
DATED : April 28, 2009
INVENTOR(S) : Valerio Gerez et al.

It is certified that error appears in the above-identified patent and that said Letters Patent is hereby corrected as shown below:

Column 4, line 49, change "readial" to --radial--;
            line 58, change "stiffness" to --stiffnesses--;
            line 59, change "stiffness" to --stiffnesses--;
            line 60, change "the" to --said--.

Signed and Sealed this

Fourteenth Day of July, 2009

JOHN DOLL
*Acting Director of the United States Patent and Trademark Office*